US00RE47950E

(19) United States
(12) Reissued Patent
Ishii et al.

(10) Patent Number: US RE47,950 E
(45) Date of Reissued Patent: Apr. 14, 2020

(54) LAMINATED INDUCTOR

(71) Applicant: TAIYO YUDEN CO., LTD., Chuo-ku, Tokyo (JP)

(72) Inventors: Koji Ishii, Takasaki (JP); Akihisa Matsuda, Takasaki (JP); Yo Fujitsuna, Takasaki (JP); Kazuhiko Oyama, Takasaki (JP); Yasuyuki Taki, Takasaki (JP)

(73) Assignee: TAIYO YUDEN CO., LTD., Tokyo (JP)

(21) Appl. No.: 15/811,303

(22) Filed: Nov. 13, 2017

Related U.S. Patent Documents

Reissue of:
(64) Patent No.: 9,190,202
Issued: Nov. 17, 2015
Appl. No.: 14/092,531
Filed: Nov. 27, 2013

(30) Foreign Application Priority Data

Nov. 29, 2012 (JP) ..... 2012-261733

(51) Int. Cl.
*H01F 17/00* (2006.01)
*H01F 27/29* (2006.01)

(52) U.S. Cl.
CPC ..... *H01F 17/0013* (2013.01); *H01F 27/292* (2013.01); *H01F 17/0033* (2013.01); *H01F 2017/004* (2013.01)

(58) Field of Classification Search
CPC .. H01F 17/0013; H01F 27/292; H01F 17/004; H01F 17/0033
(Continued)

(56) References Cited

U.S. PATENT DOCUMENTS 4,918,570 A * 4/1990 Okamura et al. ..... 361/321.2
6,218,925 B1 * 4/2001 Iwao ..... H01F 17/0013 336/200
(Continued)

FOREIGN PATENT DOCUMENTS

JP 2000-348939 A 12/2000
JP 2000348939 A 12/2000
(Continued)

OTHER PUBLICATIONS

Non-Final Office Action issued by U.S. Patent and Trademark Office, dated Feb. 11, 2015, for related U.S. Appl. No. 14/092,531.

*Primary Examiner* — Kenneth Whittington
(74) *Attorney, Agent, or Firm* — Law Office of Katsuhiro Arai

(57) ABSTRACT

A laminated inductor includes a component body that provides a mounting surface on one of its faces, and at least a pair of external electrodes are formed on the mounting surface, wherein the component body has a laminate constituted by multiple insulator layers, a spiral coil conductor formed in the laminate, and leader parts that electrically connect the coil conductor and external electrodes; the coil conductor comprises conductor patterns formed in the insulator layers and via hole conductors that penetrate through the insulator layers and electrically connect the multiple conductor patterns, and also has a coil axis running roughly in parallel with the mounting surface and a turn unit having one or more sides running roughly in parallel with the mounting surface; and the via hole conductors are formed only on the side farthest away from the mounting surface among the one or more sides.

10 Claims, 3 Drawing Sheets

(58) Field of Classification Search
USPC ..... 336/200, 222, 223, 225, 232
See application file for complete search history.

(56) References Cited

U.S. PATENT DOCUMENTS

| | | | | |
|---|---|---|---|---|
| 6,630,881 | B1 * | 10/2003 | Takeuchi et al. | 336/200 |
| 6,675,462 | B1 * | 1/2004 | Takahashi | 29/602.1 |
| 8,669,839 | B2 * | 3/2014 | Yokoyama | H01F 27/292 336/200 |
| 2003/0117230 | A1 * | 6/2003 | Shin | 333/116 |
| 2006/0049905 | A1 * | 3/2006 | Maeda et al. | 336/200 |
| 2009/0097219 | A1 * | 4/2009 | Cho | H01G 4/40 361/763 |
| 2010/0127812 | A1 * | 5/2010 | Maeda | H01F 17/0013 336/200 |
| 2010/0253464 | A1 * | 10/2010 | Miyoshi et al. | 336/200 |
| 2013/0200980 | A1 * | 8/2013 | Yokoyama et al. | H01F 17/0013 336/200 |
| 2013/0214888 | A1 * | 8/2013 | Nogi et al. | 336/192 |

FOREIGN PATENT DOCUMENTS

| | | | |
|---|---|---|---|
| WO | 2011132626 | A1 | 10/2011 |
| WO | WO2011132626 | * | 10/2011 |

* cited by examiner

Fig. 4
New
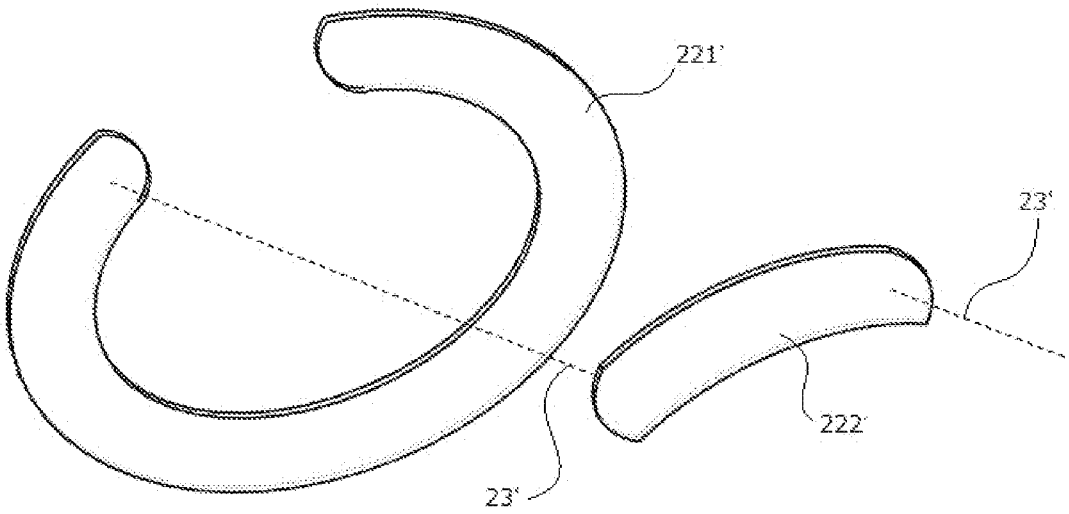

LAMINATED INDUCTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a laminated inductor.

DESCRIPTION OF THE RELATED ART

Laminated inductors have been manufactured by means of combining, for example, multiple conductor patterns obtained from multiple screen masks, or multiple conductor patterns obtained by shifting identical screen masks. In recent years, high-frequency inductors are required to demonstrate narrow tolerance characteristics as well as improved characteristics at high frequencies.

According to Patent Literature 1, a coil conductor whose rectangular solid component body provides a mounting surface on one of its faces and which has a center axis running in parallel with the mounting surface, is formed in a laminate constituted by insulator layers. The coil conductor is constituted by coil patterns formed in the laminate, and via hole conductors that conduct two or more of the coil patterns. The via hole conductors are formed in both the region near the mounting surface and region far from the mounting surface.

BACKGROUND ART LITERATURES

[Patent Literature 1] Japanese Patent Laid-open No. 2000-348939

SUMMARY

According to the constitution described in Patent Literature 1, the via hole conductors in the region near the mounting surface are positioned close to and in parallel with the external electrodes. This constitution is subject to generation of stray capacitance and consequent drop in high-frequency characteristics, especially Q characteristics. An object of the present invention is to provide a laminated inductor of smaller stray capacitance and high Q.

After studying in earnest, the inventors completed the present invention described below.

The laminated inductor proposed by the present invention has a component body that provides a mounting surface on one of its faces, and at least a pair of external electrodes formed on the surface of the mounting surface. The component body has a laminate constituted by multiple insulator layers, a spiral coil conductor formed in the laminate, and leader parts that conduct the coil conductor and external electrodes. The coil conductor comprises conductor patterns formed in the insulator layers, and via hole conductors that penetrate through the insulator layers and electrically connect the multiple conductor patterns. The coil conductor has a coil axis running roughly in parallel with the mounting surface, and a turn unit whose one or more sides are running roughly in parallel with the mounting surface. The via hole conductors are formed only on the side farthest away from the mounting surface among the one or more sides running roughly in parallel with the mounting surface. To be more specific, if there is only one side running roughly in parallel with the mounting surface, then the via hole conductors are formed only on this one side; if there are multiple sides running roughly in parallel with the mounting surface, then the via hole conductors are formed only on the side farthest away from the mounting surface among these sides.

The conductor pattern is a polygon having three or more apexes, or preferably it comprises a combination of a C-shaped pattern of roughly rectangular shape that has four apexes and a part of one side missing and a bar-shaped pattern of roughly linear shape, where the bar-shaped pattern is longer than the length of the missing part of the C-shaped pattern. Preferably the bar-shaped pattern constitutes at least a part of the side farthest away from the mounting surface. Separately, it is preferred that a pair of external electrodes are formed on the mounting surface by sandwiching the insulation region and at least some via hole conductors are formed in such a way that their vertically projected shapes on the mounting surface are positioned in the insulation region. Also separately, it is preferred that a pair of external electrodes are formed on the mounting surface and the maximum distance between two points of the vertically projected shapes of all via hole conductors on the mounting surface is shorter than the interval between the pair of external electrodes. According to a favorable embodiment, the laminated inductor is constituted in such a way that the center axis of the coil conductor passes farther away from the mounting surface than the plane running in parallel with the mounting surface, and also passes the midpoint between the mounting surface and the farthest part of the component body from the mounting surface. Preferably the vertically projected shapes of the leader parts on the mounting surface are positioned on the outer side of the vertically projected shape of the coil conductor on the mounting surface. The external electrodes are not limited to the mounting surface and preferably they are formed over a section of at least one face of the component body adjoining the mounting surface.

According to the present invention, the stray capacitance between the external electrodes and coil conductor can be reduced by the longer distances between the external electrodes and via hole conductors, which in turn improves the high-frequency characteristics, especially Q characteristics. In addition, any negative effect that may result from the shifting of via hole conductors can be mitigated because all via hole conductors are provided on one side, and this allows the coil size, such as coil diameter, to be increased relative to the size of the component body. Combined use of the C-shaped pattern and bar-shaped pattern increases the dimensional stability of the coil conductor and allows the tolerance for inductance to be narrowed, and also requires fewer print screens to reduce the manufacturing cost. Preferably the center axis of the coil conductor is positioned far from the mounting surface so that the stray capacitance between the external electrodes and coil conductor can be reduced further, while in another favorable embodiment the height of the laminated inductor can be reduced.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

*FIG. 4 is a drawing explaining another C-shaped pattern and bar-shaped pattern.*

DESCRIPTION OF THE SYMBOLS

Figure 1:
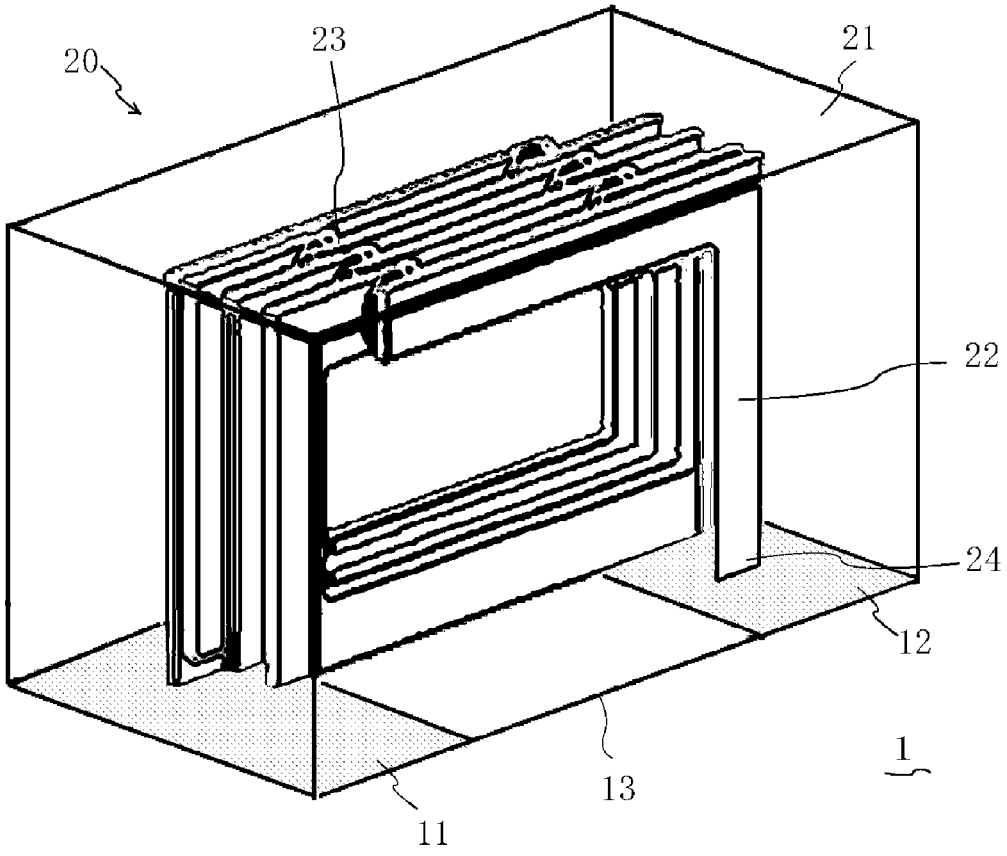
FIG. 1 is a schematic oblique perspective view of an example of a laminated inductor conforming to the present invention.

1: Laminated inductor, 11, 12: External electrode, 13: Insulation region, 14: Mounting surface, 15: 20: Opposing surface, b1: Plane passing the center between a mounting surface and an opposing surface, b2: Center axis of a coil conductor, Component body, 21: Laminate, 22: Via hole conductor, 23: Via hole conductor, 24: Leader part, 221: C-shaped pattern, 222: bar-shaped pattern.

DETAILED DESCRIPTION OF EMBODIMENTS

The present invention is described in detail below by referring to the drawings as deemed appropriate. Note, however, that the present invention is not limited to the embodiments illustrated, and that, because characteristic parts of the invention may be emphasized in the drawings, the scale of each part of the drawings is not always accurate.

FIG. 1 is a schematic oblique perspective view of an example of a laminated inductor conforming to the present invention.

Figure 3:
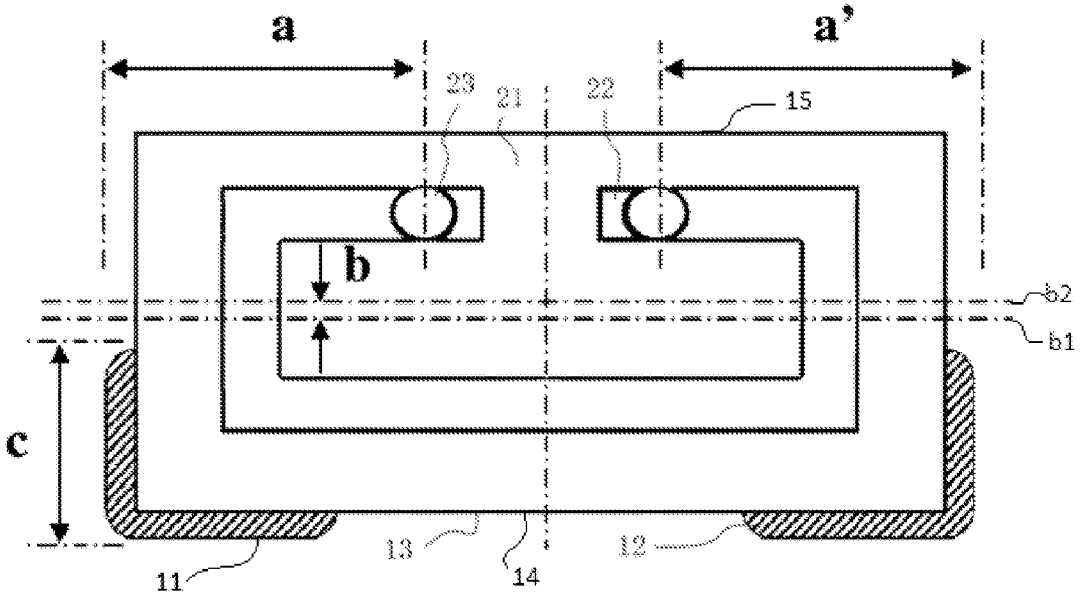
FIG. 3 is a schematic section view of a laminated inductor conforming to the present invention.

The laminated inductor 1 conforming to the present invention has a component body 20 and external electrodes 11, 12 formed on the surface of the component body 20. The external electrodes 11, 12 are electrodes exposed on the exterior surface of the laminated inductor 1, and the component body 20 constitutes a structure of the laminated inductor other than the external electrodes. The laminated inductor 1 provides a mounting surface on one of its faces. The mounting surface is intended to contact the substrate or other object on which the component is mounted. According to the embodiment of FIG. 1, the bottom face according to the orientation of the figure is the mounting surface. In the text below, vertical relationships may be described by assuming that, with respect to the position relationship of the mounting surface and component body 20, the mounting surface is set on the "bottom side." The external electrodes 11, 12 are formed at least on the mounting surface. Normally a pair of external electrodes 11, 12 is formed on the mounting surface with a specified distance in between, and an insulation region 13 which constitutes a part of the component body 20 is present between the two external electrodes 11, 12. The external electrodes 11, 12 may be formed not only on the mounting surface, but also over a section of at least one face of the component body 20 adjoining the mounting surface. FIG. 3 is a schematic section view of a laminated inductor conforming to the present invention. As shown in the embodiment of FIG. 3, the external electrodes 11, 12 may extend from the mounting surface to one side face to three side faces connecting the mounting surface 14.

Returning to FIG. 1, the component body 20 has a laminate 21 constituted by insulator layers, a coil conductor (22, 23) formed in the laminate 21, and leader parts 24. The leader parts 24 electrically connect the coil conductor and external electrodes 11, 12, respectively. The coil conductor comprises conductor patterns 22 and via hole conductors 23. The conductor patterns 22 are normally formed on one face of the insulator layers. The via hole conductors 23 penetrate through the insulator layers and electrically connect the multiple conductor patterns 22 formed on different insulator layers.

Figure 2:
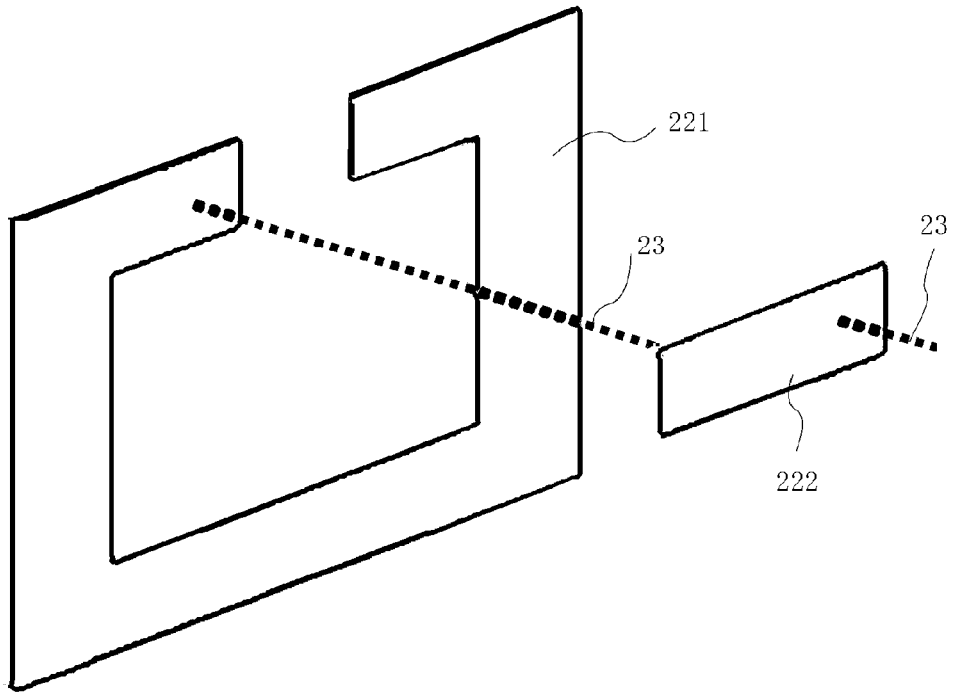
FIG. 2 is a drawing explaining [the] *a* C-shaped pattern and bar-shaped pattern.

Preferably the conductor pattern 22 comprises a combination of a C-shaped pattern and bar-shaped pattern. FIG. 2 is a drawing explaining the C-shaped pattern and bar-shaped pattern. A C-shaped pattern 221 is a polygonal conductor pattern having three or more apexes. A representative example is a pattern of roughly rectangular shape that has four apexes, where a part of one side of the roughly rectangular shape is missing. The roughly rectangular shape is not limited to the rectangular shape shown in FIG. 2, but it also includes an elliptical shape (*as shown in FIG. 4*) or other shape close to rectangle. The C-shaped pattern 221 of roughly rectangular shape having four axes includes a pattern having four apexes as shown in FIG. 2, and a pattern that has no clear apexes defining a roughly rectangular shape but has parts that may be recognized as apexes defining a shape close to rectangle. The dotted lines in FIG. 2 indicate positions where via hole conductors 23 (*via hole conductors 23' in FIG. 4*) are formed.

A bar-shaped pattern 222 fills in a missing part on one side of the C-shaped pattern 221 of roughly rectangular shape. The bar-shaped pattern 222 may be linear, as shown in FIG. 2, or it may be a curved line *as shown in FIG. 4* (*the bar-shaped pattern 222'*) that constitutes a part of an elliptical shape, according to the actual roughly rectangular shape. Combined use of the C-shaped pattern 221 (*the C-shaped pattern 221' in FIG. 4*) and bar-shaped pattern 222 (*the bar-shaped pattern 222' in FIG. 4*) increases the dimensional stability of the coil conductor and allows the tolerance for inductance to be narrowed, and also requires fewer print screens to reduce the manufacturing cost. Preferably the length of the bar-shaped pattern 222/*222'* is greater than the length of the missing part of the C-shaped pattern 221/*221'*, as this achieves more reliable electrical connection.

The coil conductor 22, 23 is spiral or helical in shape, and has a specified turn unit as well as a coil axis running roughly at right angles to the plane specified by the turn unit. The coil axis passing the center of the plane specified by the turn unit of the coil conductor is defined as the center axis of the coil conductor. Under the present invention, the coil axis is parallel with the mounting surface. Preferably the turn unit is mainly specified by the conductor patterns 22.

Preferably the coil axis of the coil conductor is positioned above the center of the component body 20. To be more specific, first a plane running in parallel with the mounting surface and also passing the midpoint between the mounting surface and the farthest part of the component body 20 from the mounting surface is specified. Then, preferably the laminated inductor is constituted in such a way that the coil axis of the coil conductor passes above this parallel plane, or specifically farther away from the mounting surface. To be specific, preferably dimension b in the embodiment of FIG. 3 is not zero. This way, the stray capacitance between the external electrodes 11, 12 and coil conductor 22, 23 can be reduced further.

The spiral shape formed by the coil conductor 22, 23 may be, for example, a structure where a turn unit of roughly rectangular shape repeats itself while moving in translational motion along the coil axis, where the turn unit is not limited to a rough rectangle, but it also includes a rough ellipse or shape combining rectangle and ellipse. The turn unit has at least one side, or preferably two or more sides, running roughly in parallel with the mounting surface.

Under the present invention, the via hole conductors 23 are formed only on the side farther away from (above) the mounting surface, among the one or more sides running roughly in parallel with the mounting surface. To be more specific, if there is only one side running roughly in parallel with the mounting surface, then the via hole conductors are formed only on this one side; if there are multiple sides running roughly in parallel with the mounting surface, then the via hole conductors are formed only on the side farthest away from the mounting surface among these sides. If the C-shaped pattern and bar-shaped pattern are present, as mentioned above, preferably the bar-shaped pattern constitutes at least a part of the "side running roughly in parallel with the mounting surface and also farthest away from the mounting surface." According to this constitution, the distances between the external electrodes 11, 12 and vial hole conductors 23 become greater. As a result, the stray capacitance between the external electrodes 11, 12 and coil conductor can be reduced, which in turn improves the high-frequency characteristics, especially Q characteristics. In addition, any negative effect that may result from the shifting of via hole conductors 23 can be mitigated because all via hole conductors 23 are provided on one side, and this allows the coil size, such as coil diameter, to be increased relative to the size of the component body 20.

Here, projected shapes of the via hole conductors 23 and leader parts 24 on the mounting surface are assumed. These projected shapes are those obtained by projecting the via hole conductors 23 and leader parts 24 vertically onto the mounting surface. According to a favorable embodiment of the present invention, a pair of external electrodes 11, 12 are formed on the mounting surface by sandwiching an insulation region 13, where at least some via hole conductors 23 are formed in such a way that their vertically projected shapes on the mounting surface are positioned in the insulation region 13. Simply put, the vertically projected shapes of via hole conductors 23 are placed inside the pair of external electrodes 11, 12. In the embodiments of FIGS. 1 and 3, for example, the vertically projected shapes of via hole conductors 23 are placed inside the external electrodes 11, 12. This way, the stray capacitance between the external electrodes 11, 12 and via hole conductors 23 can be reduced.

According to another favorable embodiment of the present invention, the pair of external electrodes 11, 12 are formed on the mounting surface and all via hole conductors 23 are formed in such a way that the maximum distance between two points of the vertically projected shapes of via hole conductors 23 on the mounting surface becomes shorter than the interval between the pair of external electrodes 11, 12. This way, not only high Q characteristics can be achieved, but the tolerance for inductance can also be narrowed due to the dimensional stability of the coil conductor.

According to yet another favorable embodiment, the laminated inductor is constituted in such a way that the vertically projected shapes of the leader parts 24 on the mounting surface are positioned on the outer side of the vertically projected shape of the coil conductor on the mounting surface. Here, "outer side" means closer to the end when the center of the component body 20 is used as the reference. This way, the leader parts 24 do not lessen the coil diameter and therefore drop in inductance, or other adverse change can be suppressed.

A laminated inductor according to the present invention can be manufactured based on the aforementioned structure by applying any suitable conventional methods as deemed appropriate. An example of manufacturing such laminated inductor is explained, but it should be noted that the manufacturing method is not at all limited to this example. First, multiple green sheets made of insulating material are prepared. These green sheets are each formed by applying onto a film using the doctor blade method, etc., a slurry made of insulating material whose primary ingredient is glass, etc. Here, the insulating material may be one whose primary ingredient is glass, or dielectric ceramics, ferrite, soft magnetic alloy material, or resin or other material into which insulating material is mixed. Through holes are formed by means of laser processing, etc., at specified positions on the green sheets, or specifically the positions where via hole conductors 23 will be formed. Then, a conductive paste prepared as a precursor of conductor pattern 22 is printed by means of screen masking, etc., at the specified positions on the green sheets, respectively. The primary ingredient of this conductive paste may be silver, copper or other metal, for example.

Next, the green sheets are laminated in a specified order and then pressure is applied in a laminating direction to pressure-bond the green sheets. Then, the pressure-bonded green sheets made of insulating material are cut in units of chips, after which each chip is sintered at a specified temperature (such as 800° C. to 900° C. or so) to form a component body 20. Next, external electrodes 11, 12 are formed at specified positions on the mounting surface of each such component body 20. A laminated inductor is now formed. The external electrodes 11, 12 are formed by applying an electrode paste whose primary ingredient is silver, copper, etc., and then baking the electrode paste at the specified temperature (such as 680° C. to 900° C. or so), followed by electroplating, etc. Cu, Ni, Sn, etc., may be used for this electroplating. The laminated inductor is completed through the steps described above.

EXAMPLES

Examples are given to explain the present invention in greater detail. Note, however, that the examples below do not limit the scope of the present invention in any way.

Borosilicic acid glass powder of dielectric constant 5 and carbon black were dispersed in alcohol together with binder to obtain a slurry. This slurry was applied onto a PET film using the doctor blade method while being dried at the same time, to obtain a green sheet. The green sheet was cut and a specified number of through holes of 50 μm in diameter were made by YAG laser in each cut sheet. The positions of through holes are specified below (also refer to FIG. 3). An ink constituted by silver, binder, and organic solvent was used to screen-print a conductor pattern 22 according to the through holes. The conductor pattern 22 had a rectangular shape with a long side of 0.350 mm, short side of 0.150 mm, and line width of 0.05 mm, comprising a C-shaped pattern 221 and bar-shaped pattern (not illustrated). As for the C-shaped pattern, a through hole for via hole conductor was provided at a position corresponding to dimension a and another at a position corresponding to dimension a' in FIG. 3, and the pattern was extended by 0.025 mm beyond each of these positions to obtain a rectangular structure whose one side has a missing part near the center. The bar-shaped pattern was constituted as a straight line pattern that is 0.1 mm longer than the length of the missing part of the C-shaped pattern. Sheets having a conductor pattern 22 (C-shaped pattern or bar-shaped pattern) and those on which no pattern was printed were stacked on top of one another and compressed with a pressure of 100 kgf/cm$^2$ at a temperature of 100° C. into one piece. The obtained bar was cut with a dicing blade and each cut piece was sintered for 1 hour at 900° C. to obtain a base. The same ink used for conductor patterns 22 was printed on the leader electrode surfaces of the obtained base, after which the ink was sintered for 1 hour at 700° C. to obtain external electrodes 11, 12. Thereafter, the external electrodes 11, 12 were plated with nickel and tin using the barrel plating method to obtain a finished product. The finished product had a dimension of 0.580 mm in a length (L) direction, 0.03 mm in a width (W) direction, and 0.300 mm in a height (T) direction, and the width of the external electrode was 0.150 mm.

To explain the dimensions shown in FIG. 3, (a, a', b, c), a and a' indicate the positions where via hole conductors 23 are formed, b indicates the level of upward deviation of the center axis b2 of the coil conductor from the plane b1 passing the center between the mounting surface 14 and opposing surface 15 of the component body 20, and c indicates the spreading height of the external electrodes 11, 12. These dimensions were measured by polishing the obtained laminated inductor 1 and then observing its section using a magnifying glass. The laminated inductor was constituted in such a way that the leader parts 24 would be positioned 0.025 mm outside of the coil conductor 22, 23 in the component body.

The manufacturing conditions used in each of the examples and comparative examples are as follows:

Example 1: a=150 μm, a'=150 μm, b=0, c=0
Example 2: a=200 μm, a'=200 μm, b=0, c=0
Example 3: a=250 μm, a'=250 μm, b=0, c=0
Example 4: a=250 μm, a'=250 μm, b=0, c=150 μm
Example 5: a=250 μm, a'=250 μm, b=50 μm, c=0
Comparative Example 1: a=150 μm, a'=150 μm, b=0, c=0
Comparative Example 2: a=150 μm, a'=150 μm, b=0, c=0

Note that, in Examples 1 to 5, via hole conductors 23 were formed only on the side farther away from the mounting surface between the two sides of the conductor pattern 22 running in parallel with the mounting surface, as shown in FIG. 3. In Comparative Example 1, on the other hand, via hole conductors 23 were formed on both sides of the conductor pattern 22 running in parallel with the mounting surface, which is different from what is expressed in FIG. 3. To be more specific, the sheets were laminated in such a way that the cutouts in their C-shaped patterns 221 would alternate in orientation in the vertical direction, to allow via hole conductors 23 to be formed alternately on the side far from the mounting surface and side near the mounting surface. In Comparative Example 2, via hole conductors 23 were formed only on the side near the mounting surface between the two sides of the conductor pattern 22 running in parallel with the mounting surface, which is different from what is expressed in FIG. 3.

The laminated inductors obtained by these examples and comparative examples were measured for Q before and after mounting, using an impedance analyzer (E4991A by Agilent) and at an inductance of 4.7 nH and measurement frequency of 1.8 GHz. The measured results are as follows:

In Example 1, Q was 46 before mounting and 46 after mounting.

In Example 2, Q was 47 before mounting and 46 after mounting.

In Example 3, Q was 47 before mounting and 46 after mounting.

In Example 4, Q was 46 before mounting and 46 after mounting.

In Example 5, Q was 48 before mounting and 48 after mounting.

In Comparative Example 1, Q was 40 before mounting and 39 after mounting.

In Comparative Example 2, Q was 38 before mounting and 36 after mounting.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-261733, filed Nov. 29, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A laminated inductor having a component body that provides a mounting surface on one face of the component body, and at least a pair of external electrodes formed on the mounting surface, wherein:

the component body has a laminate constituted by multiple insulator layers, a spiral coil conductor formed in the laminate, and leader parts that electrically connect the coil conductor and the external electrodes, respectively;

the coil conductor comprises multiple conductor patterns formed in the insulator layers and via hole conductors that penetrate through the insulator layers and electrically connect the multiple conductor patterns in a direction parallel to the mounting surface, constituting turn units, wherein a coil axis runs roughly in parallel with the mounting surface and roughly perpendicularly to the turn units, said turn units having sides roughly in parallel with and perpendicular to the mounting surface, respectively; and all of the via hole conductors are formed only on [a side] *one of the sides of the turn units, which is* farthest away from the mounting surface among the sides of the turn units, wherein the conductor pattern comprises a combination of a C-shaped pattern [constituted by a polygonal shape having three or more apexes and] having a part of one side missing, and a bar-shaped pattern constituted by (*i*) a roughly straight line shape *when the C-shaped pattern is a roughly polygonal pattern having three or more apexes and having a part of one side missing, or* (*ii*) *a curved line that constitutes a part of an elliptical shape when the bar-shaped pattern and the C-shaped pattern constitute the elliptical shape*, the bar-shaped pattern is longer than a length of the missing part of the C-shaped pattern, and the bar-shaped pattern constitutes at least a part of the side farthest away from the mounting surface.

2. A laminated inductor according to claim 1, wherein the pair of external electrodes are formed on the mounting surface apart from each other via an insulation region, where at least some via hole conductors are formed such that their vertically projected shapes on the mounting surface are positioned within the insulation region.

3. A laminated inductor according to claim 1, wherein the pair of external electrodes are formed on the mounting surface and a maximum distance between two points of vertically projected shapes of all via hole conductors per turn unit on the mounting surface is shorter than an interval between the pair of external electrodes.

4. A laminated inductor according to claim 1, wherein the laminated inductor is constituted wherein a center axis of the coil conductor passes farther away from the mounting surface than a plane running in parallel with the mounting surface and passing a midpoint between the mounting surface and the farthest part of the component body from the mounting surface.

5. A laminated inductor according to claim 1, wherein the laminated inductor is constituted such that vertically projected shapes of the leader parts on the mounting surface are positioned on an outer side of a vertically projected shape of the coil conductor on the mounting surface.

6. A laminated inductor according to claim 1, wherein the external electrodes are formed on the mounting surface and also over a section of at least one face of the component body connecting the mounting surface.

7. A laminated inductor according to claim 2, wherein the external electrodes are formed on the mounting surface and also over a section of at least one face of the component body connecting the mounting surface.

8. A laminated inductor according to claim 3, wherein the external electrodes are formed on the mounting surface and also over a section of at least one face of the component body connecting the mounting surface.

9. A laminated inductor according to claim 4, wherein the external electrodes are formed on the mounting surface and also over a section of at least one face of the component body connecting the mounting surface.

10. A laminated inductor according to claim 5, wherein the external electrodes are formed on the mounting surface and also over a section of at least one face of the component body connecting the mounting surface.

* * * * *